(12) United States Patent
Donachy et al.

(10) Patent No.: US 11,599,161 B2
(45) Date of Patent: Mar. 7, 2023

(54) THICK ADAPTIVE DEVICE CARRIER

(71) Applicant: DELL PRODUCTS, LP, Round Rock, TX (US)

(72) Inventors: John Donachy, Austin, TX (US); Eduardo Escamilla, Round Rock, TX (US); Sean O'Donnell, Poughkeepsie, NY (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 17/347,855

(22) Filed: Jun. 15, 2021

(65) Prior Publication Data
US 2022/0399044 A1    Dec. 15, 2022

(51) Int. Cl.
*G06F 1/18* (2006.01)
*G11B 33/12* (2006.01)

(52) U.S. Cl.
CPC ............ *G06F 1/187* (2013.01); *G11B 33/128* (2013.01)

(58) Field of Classification Search
CPC ..... G06F 1/187; G11B 33/128; G11B 33/124; G11B 33/1493
See application file for complete search history.

(56) References Cited

U.S. PATENT DOCUMENTS

| | | | | |
|---|---|---|---|---|
| 5,325,263 | A | * | 6/1994 | Singer ................ H01R 13/6315 439/157 |
| 9,420,718 | B2 | * | 8/2016 | Du ....................... G11B 33/124 |
| 10,146,273 | B1 | | 12/2018 | Noorbakhsh |
| 11,003,613 | B2 | | 5/2021 | Escamilla et al. |

* cited by examiner

*Primary Examiner* — James Wu
(74) *Attorney, Agent, or Firm* — Larson Newman, LLP

(57) ABSTRACT

A drive carrier for a device of an information handling system includes first and second portions. The first and second portions are placed in physical communication with the device. The first portion includes first and second side rails to secure the device within the drive carrier. The first and second side rails slide within a first slot of a bay of the information handling system. The second portion is located on top of the first portion and floats away from and toward the first portion when the drive carrier is inserted with the bay of the information handling system. An amount of float for the second portion is based on a bay pitch of the bay.

20 Claims, 5 Drawing Sheets

US 11,599,161 B2

THICK ADAPTIVE DEVICE CARRIER

FIELD OF THE DISCLOSURE

The present disclosure generally relates to information handling systems, and more particularly relates to a thick adaptive device carrier.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A drive carrier for a device of an information handling system includes first and second portions. The first and second portions may be placed in physical communication with the device. The first portion includes first and second side rails to secure the device within the drive carrier. The first and second side rails may slide within a first slot of a bay of the information handling system. The second portion may be located on top of the first portion and may float away from and toward the first portion when the drive carrier is inserted with the bay of the information handling system. An amount of float for the second portion may be based on a bay pitch of the bay.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
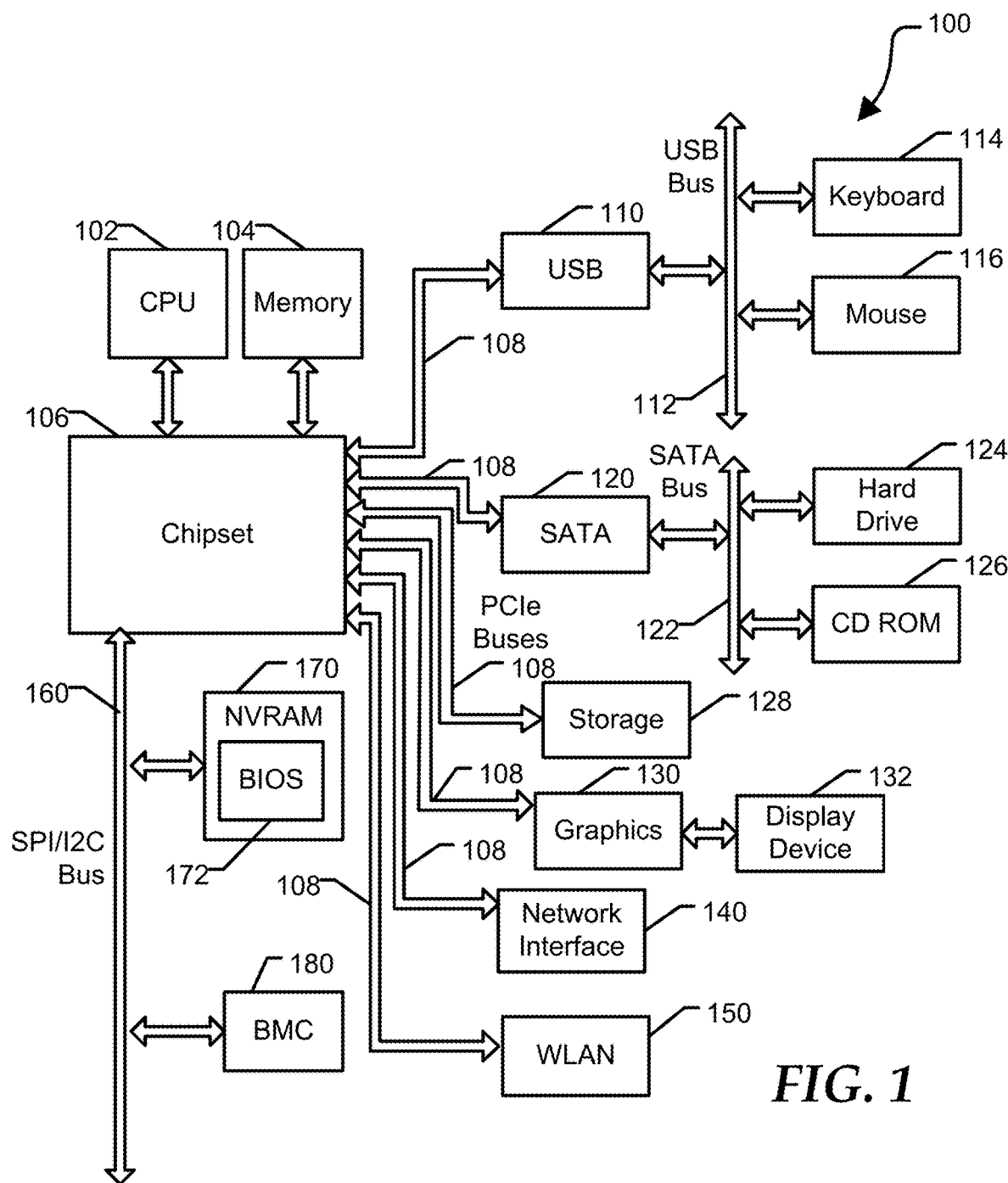
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
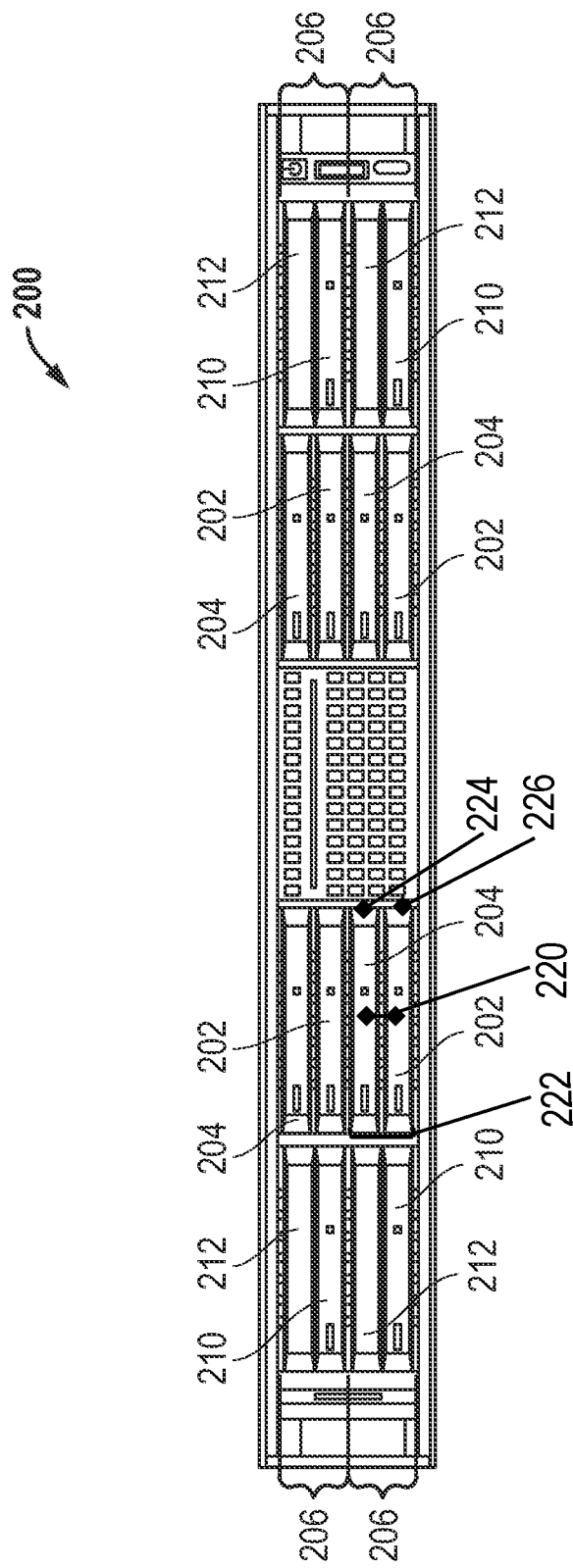
FIG. 2 is a diagram of an information handling system including multiple devices and multiple adaptive device carriers according to at least one embodiment of the disclosure.

In an example, information handling system 100 may be any suitable device including, but not limited to, devices 202 and 204 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 is a diagram of an information handling system or server 200 to receive multiple devices 202 and 204, and multiple adaptive device carriers 206 according to at least one embodiment of the disclosure. Each adaptive device carrier 206 includes a first portion 210 and a second portion 212. In an example, adaptive device carrier 206 may hold a device to be inserted within a bay of server 200. In an example, devices inserted within server 200 may be any suitable thickness, and may be either a 'thick' device or a 'thin' device. In certain examples, thick devices may be any suitable amount thicker than thin devices, such as more than twice the thickness or the like. In an example, devices 202 and 204 may include, but is not limited to, non-volatile memory express (NVMe), dynamic random access memory (DRAM) expansion, storage class memory, and network interface cards. In an example, server 200 may include a backplane with a common connector to interface with devices of different technologies.

In an example, bays of different servers may have different pitches, which in turn may affect the number of devices that may be inserted within a bay, an amount of air flow within a bay, or the like. A pitch 220 of a bay 222 may be any suitable distance within the bay including, but not limited to, a center axis distance from one drive to an adjacent drive in the bay. In an example, the pitches may vary from bay to bay in server 200. In an example, pitch variances may result in different widths between devices inserted within a bay. Devices, such as devices 202 and 204, may include spring loaded electric contacts, which may adjust to the different widths between devices. The distance or space between adjacent devices in a bay may be affected when thick devices are inserted into a bay. For example, a thick device may occupy two slots, such as first slot 224 and second slot 226, in bay 222. Spacing between devices of a bay may vary or be inconsistent when both thick and thin devices are inserted within a single bay of server 200. Adaptive device carrier 206 may improve airflow within server 200 by creating consistent spacing between devices of a bay in the server.

Figure 3:
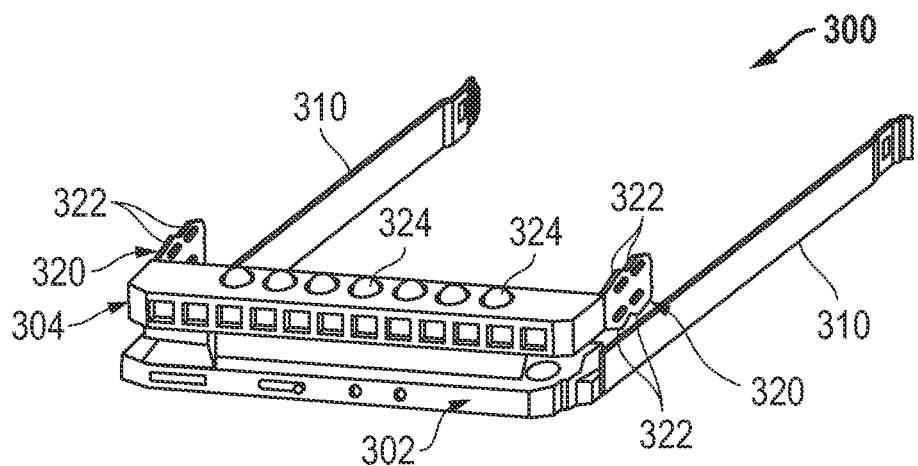
FIG. 3 is a diagram of an adaptive device carrier according to at least one embodiment of the disclosure.

FIG. 3 illustrates an adaptive device carrier 300 according to at least one embodiment of the disclosure. In an example, adaptive device carrier 300 may be any suitable device carrier including, but not limited to, device carrier 206 of FIG. 2. Adaptive device carrier 300 includes a first portion 302 and a second portion 304. First portion 302 includes multiple side rails 310. Second portion 304 includes multiple slot inserts 320, each of which includes multiple compression springs 322. Second portion 304 also includes multiple electrical contacts 324.

In an example, side rails 310 may be utilized to secure a device within adaptive device carrier 300. Side rails 310 may slide into a slot of a bay, such as a bay of server 200 of FIG. 2. In an example, the device secured within adaptive device carrier 300 may be any suitable thickness. For example, the device may typically be a thick device. However, in other situations the device may be a thin device and adaptive drive carrier 300 may allow proper airflow across the device.

In certain examples, electrical contacts 324 may be utilized to provide electrical communication between the device in adaptive device carrier 300 and one or more other devices outside of the adaptive device carrier. In an example, slot inserts 320 may be inserted within a slot above the slot containing side rails 310. Compression springs 322 may compress and expand to adjust to pitch tolerances of a bay. In an example, a larger pitch in a bay may cause compression springs 322 on the top of slot insert 320 to compress and the compression springs on the bottom of the slot insert to expand. In the opposite situation, a smaller pitch in a bay may cause compression springs 322 on the top of slot insert 320 to expand and the compression springs on the top of the slot insert to expand. An average pitch in a bay may cause compression springs 322 on both the top and the bottom of slot insert 320 to compress.

Figure 4:
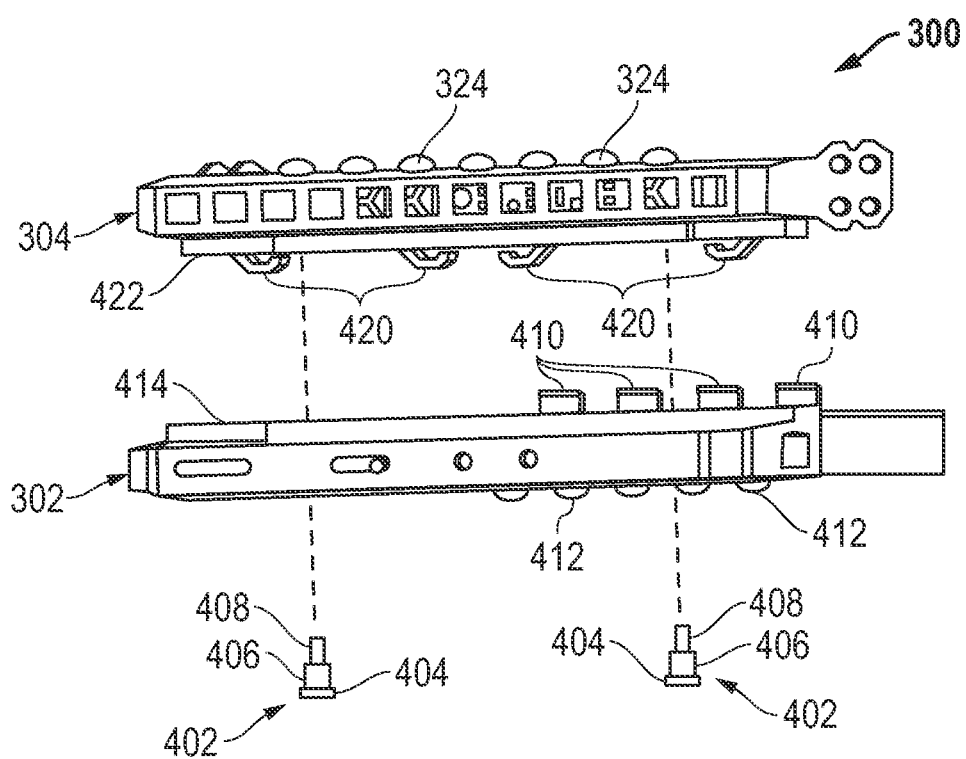
FIG. 4 is a diagram of first and second portions of the device carrier according to at least one embodiment of the disclosure.

FIG. 4 illustrates an expanded view of first portion 302 and second portion 304 of device carrier 300 according to at least one embodiment of the disclosure. Device carrier 300 includes multiple screws 402, each of which includes a head 404, a main portion 406, and an attachment portion 408. In an example, screws 402 may be any suitable type of screw including, but not limited to, shoulder screws. First portion 302 includes electrical connectors 410, electrical contacts 412, and an overlap portion 414. Electrical connectors 410 may provide an electrical communication between electrical contacts 412 of first portion 302 and electrical contacts 324 of second portion 304. Second portion 304 includes multiple springs 420 and an overlap portion 422. In an example, springs 420 may be any suitable type of springs including, but not limited to, leaf springs.

In an example, screws 402 may slide through holes in first portion 302 and may be secured to second portion 304. For example, screw 402 may be pushed through first portion 302 until head 404 of the screw is placed in physical communication with a bottom surface of the first portion. Main portion 406 may be a smooth surface to enable screw 402 to slide within first portion 402. Attachment portion 408 may be securely attached to second portion 304. As screw 402 slides within first portion 302, an amount of float of second portion 304 may change.

In certain examples, springs 420 may exert a force to push second portion 304 away from first portion 302. Screws 402 may control a maximum amount of float of second portion 304 from first portion 302. In an example, the maximum amount of float may be based on the length of screw 420. In this example, the force of springs 420 may push second portion 304 away from first portion 302 until head 404 of screw 402 is in physical communication with a bottom surface of the first portion. In an example, overlap portion 422 of second portion 304 may be located behind and extend below overlap portion 414 of first portion 302 as will be described with respect to FIG. 5.

Figure 5:
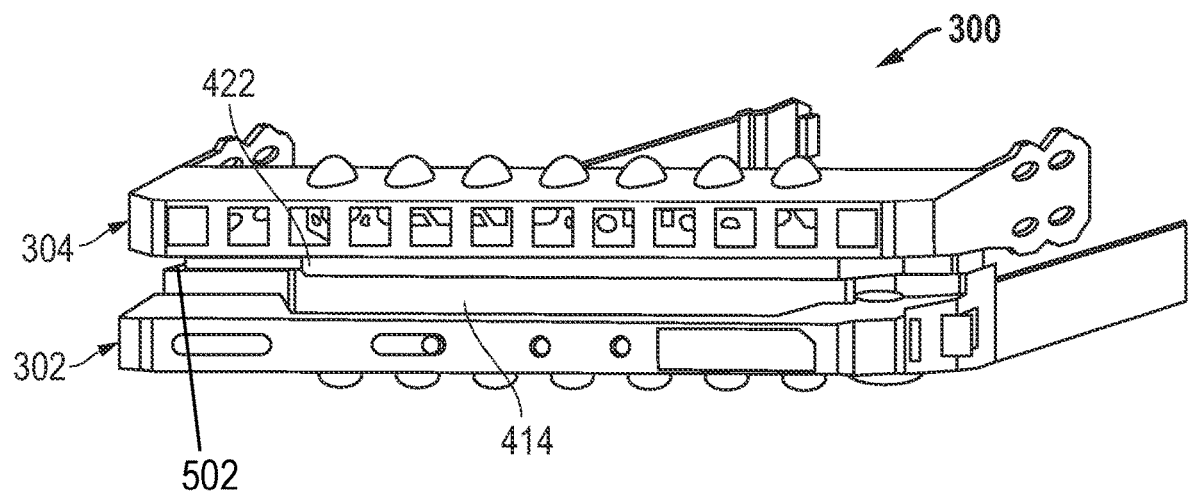
FIG. 5 is a diagram illustrating an overlap between the first and second portions of the device carrier according to at least one embodiment of the disclosure.

FIG. 5 illustrates an overlap between overlap portion 412 of first portion 302 and overlap portion 422 of second portion 304 of the device carrier 300 according to at least one embodiment of the disclosure. As shown in FIG. 5, a bottom edge of overlap portion 422 of second portion 304 may always extend below a top edge 502 of overlap portion 412 first portion 302 even when the second portion is at a maximum float distance from the first portion. In an example, the overlap between overlap portion 412 and overlap portion 422 may hide or obscure the float movement of second portion 304. For example, the overlap of overlap portion 412 and overlap portion 422 may prevent an individual associated with an information handling system from being able see in between first portion 302 and second portion 304. In this example, the float movement of second portion 304 may be less observable.

Figure 6:
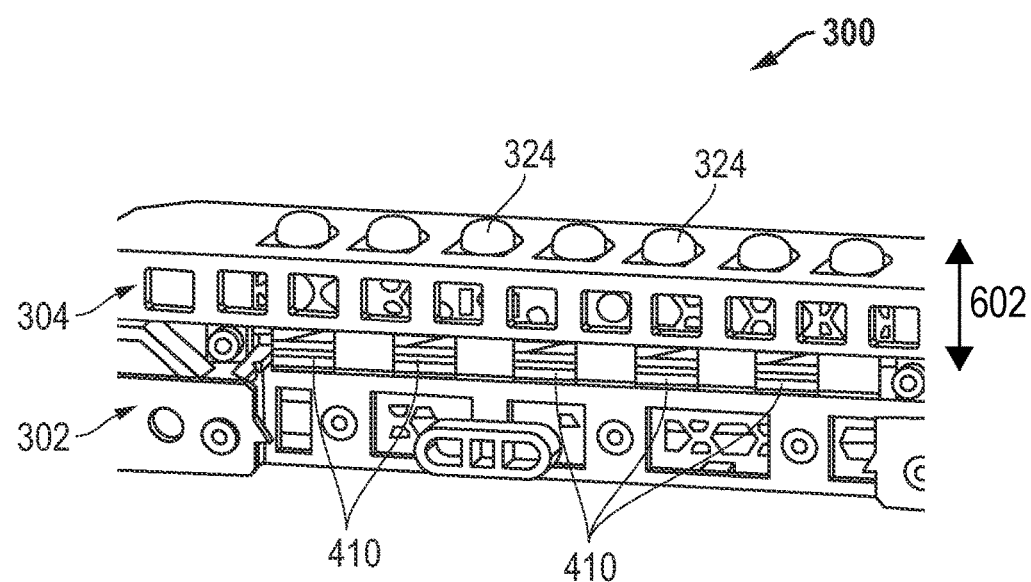
FIG. 6 is a diagram illustrating a rear view of the device carrier according to at least one embodiment of the current disclosure.

FIG. 6 illustrates a rear view of device carrier 300 according to at least one embodiment of the current disclosure. Electrical connectors 410 may be able to compress and expand to match an amount of float indicated by arrow 602, of second portion 304. In an example, electrical connectors 410 may be any suitable compressible contact including, but not limited to, leaf spring connectors. Electrical contacts 324 of second portion 304 and electrical contacts 412 of first portion 302, as shown in FIG. 4, may provide electrical communication from one device to the next, and electrical connectors 410 may provide electrical communication between the electrical contacts. In this example, electrical contacts 324 and 410, and electrical connectors 410 may combine to enable proper electrical communication regardless of an amount of float by second portion 304, which may be changed to match a pitch within a particular bay, such as pitch 220 in bay 222 of FIG. 2.

Figure 7:
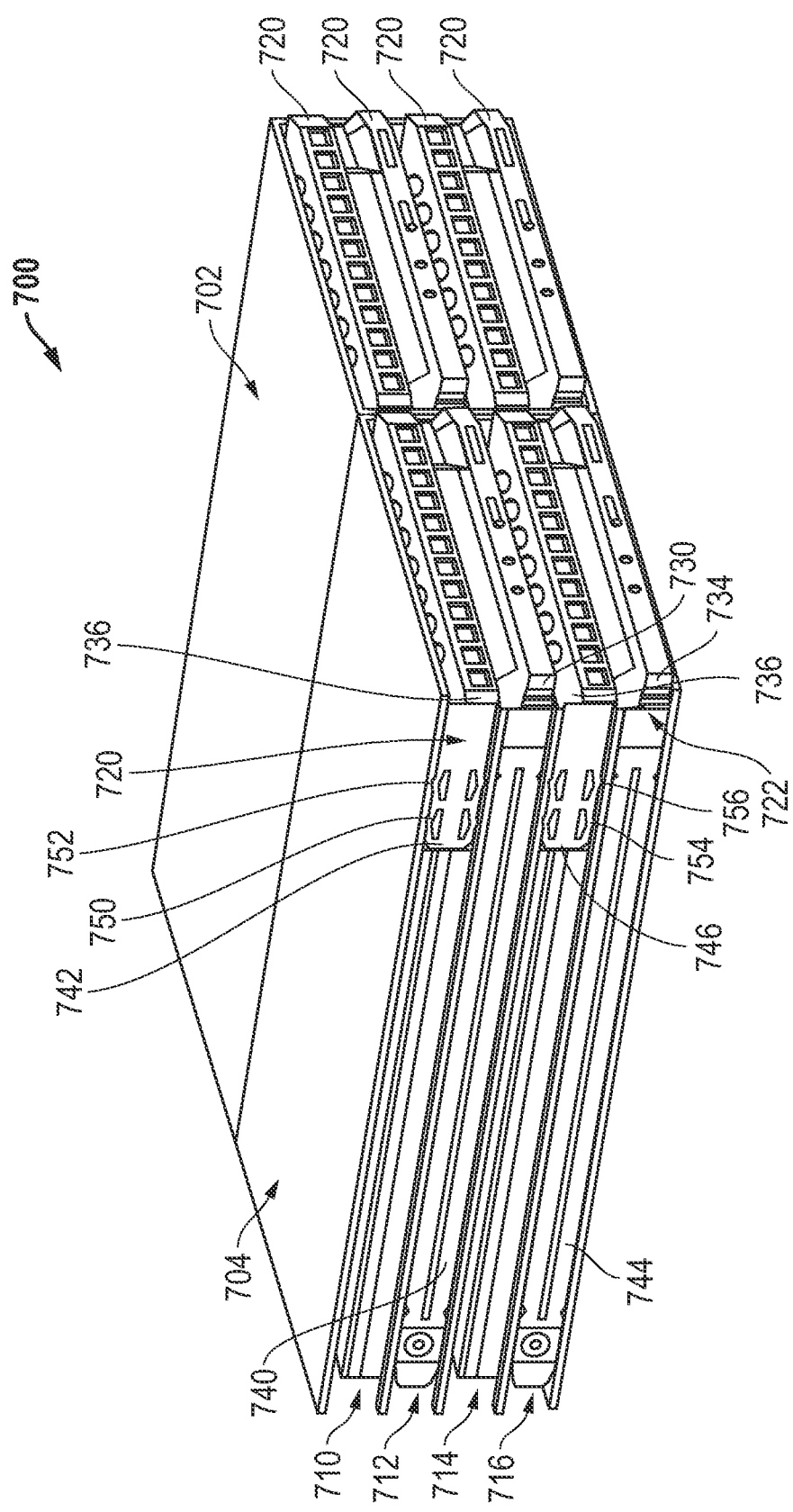
FIG. 7 is a diagram of an information handling system including multiple devices and multiple adaptive device carriers according to at least one embodiment of the current disclosure.

FIG. 7 illustrates an information handling system or server 700 including multiple bays 702 and 704 according to at least one embodiment of the current disclosure. Each of bays 702 and 704 include multiple slots 710, 712, 714, and 716. In an example, devices 720 may be inserted within each of slots 710, 712, 714, and 716 of bays 702, and adaptive device carriers 722 and 724 may be inserted within bay 704. As described above, adaptive device carrier 722 may include a first portion 730 and a second portion 732. Similarly, adaptive device carrier 724 may include a first portion 734 and a second portion 736. First portion 730 of device carrier 722 includes a side rail 740, and second portion includes a slot insert 742. First portion 734 of device carrier 724 includes a side rail 744 and a slot insert 746. Each of device carriers 722 and 724 may hold different devices to be inserted within server 700.

In certain examples, each of adaptive device carriers 722 and 724 may utilize two slots of bay 704. For example, side rails 740 of device carrier 722 may be inserted within slot 712 of bay 704, and slot insert 742 may be inserted within slot 710. In an example, slot insert 742 may include compression springs 750, which in turn may snap fit within notches 752 in slot 710 to secure device carrier 722 within bay 704. In an example, side rails 744 of device carrier 724 may be inserted within slot 716 of bay 704, and slot insert 746 may be inserted within slot 714. Slot insert 746 may include compression springs 754, which in turn may snap fit within notches 756 in slot 714 to secure device carrier 724 within bay 704.

As shown in FIG. 7, second portions 732 and 736 may float to be inserted within respective first slot 710 and second slot 714 while corresponding first portions 730 and 734 may be inserted within respective slots 712 and 716. In this example, each of first portions 730 and 734 and second portions 732 and 736 may be aligned with different device 720. The alignment between adaptive device carriers 722 and 724 and devices 720 may provide an aesthetic look to the front of server 700. Thus, floating of second portion 732 and 736 of respective device carriers 722 and 724 may enable proper electric connections between devices in bay 704 and may provide an aesthetic look to server 700

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A drive carrier for a device of an information handling system, the drive carrier comprising:
    a first portion to be placed in physical communication with the device, the first portion including:
        first and second side rails to secure the device within the drive carrier, the first and second side rails to slide within a first slot of a bay of the information handling system; and
    a second portion to be placed in physical communication with the device, the second portion located on top of the first portion and floating away from and toward the first portion when the drive carrier is inserted within the bay of the information handling system, wherein an amount of float for the second portion is based on a bay pitch of the bay.

2. The drive carrier of claim 1, wherein the second portion includes:
    a plurality of springs to be placed in physical communication with the first portion, the springs to compress to decrease the amount of float and to expand to increase the amount of float.

3. The drive carrier of claim 1, further comprising:
    a plurality of shoulder screws, the shoulder screws to provide a maximum distance the second portion may float from the first portion.

4. The drive carrier of claim 1, the second portion includes:
    a slot insert to slide within a second slot of the bay, wherein the slot insert is substantially parallel with one of the first and second side rails.

5. The drive carrier of claim 4, wherein the slot insert includes a plurality of compression springs to secure the slot insert within the second slot of the bay.

6. The drive carrier of claim 1, further comprising:
a plurality of electrical connectors in physical communication with both the first and second portions of the drive carrier, wherein the electrical connectors provide electrical connections between a first plurality of electrical contacts on the first portion and a second plurality of electrical contacts on the second portion.

7. The drive carrier of claim 1, wherein the first portion includes a first overlap and the second portion includes a second overlap, wherein the second overlap extends from the second portion and below a top edge of the first overlap.

8. The drive carrier of claim 1, wherein a height of the device is greater than a height of a slot of the server.

9. An information handling system comprising:
a bay including a first slot and a second slot;
a device to be inserted within the bay; and
a device carrier to be in physical communication with the device, the device carrier including:
a first portion to be placed in physical communication with the device, the first portion including:
first and second side rails to secure the device within the drive carrier, the first and second side rails to slide within the first slot of the bay; and
a second portion to be placed in physical communication with the device, the second portion located on top of the first portion and floating away from and toward the first portion when the drive carrier is inserted within the bay of the information handling system, wherein an amount of float for the second portion is based on a bay pitch of the bay.

10. The information handling system of claim 9, wherein the second portion of the device carrier includes:
a plurality of springs to be placed in physical communication with the first portion, the springs to compress to decrease the amount of float and to expand to increase the amount of float.

11. The information handling system of claim 9, wherein the driver carrier further includes:
a plurality of shoulder screws, the shoulder screws to provide a maximum distance the second portion may float from the first portion.

12. The information handling system of claim 9, the second portion of the device carrier includes:
a slot insert to slide within the second slot of the bay, wherein the slot insert is substantially parallel with one of the first and second side rails.

13. The information handling system of claim 12, wherein the slot insert includes a plurality of compression springs to secure the slot insert within the second slot of the bay.

14. The information handling system of claim 9, wherein the device carrier further includes:
a plurality of electrical connectors in physical communication with both the first and second portions of the drive carrier, wherein the electrical connectors provide electrical connections between a first plurality of electrical contacts on the first portion and a second plurality of electrical contacts on the second portion.

15. The information handling system of claim 9, wherein the first portion includes a first overlap and the second portion includes a second overlap, wherein the second overlap extends from the second portion and below a top edge of the first overlap.

16. The information handling system of claim 9, wherein a height of the device is greater than a height of a slot of the server.

17. An information handling system comprising:
a plurality of bays including first and second bays, the first bay including a first plurality of slots and each of the first slots including a different device, and the second bay including a second plurality of slots including a first slot and a second slot;
a device to be inserted within the second bay; and
a device carrier to be in physical communication with the device, the device carrier including:
a first portion to be placed in physical communication with the device, the first portion including:
first and second side rails to secure the device within the drive carrier, the first and second side rails to slide within the first slot of the second bay;
a second portion to be placed in physical communication with the device, the second portion located on top of the first portion and floats away from and toward the first portion when the drive carrier is inserted with the second bay, wherein an amount of float for the second portion is based on a bay pitch of the second bay;
a plurality of springs to be placed in physical communication with the first portion, the springs to compress to decrease the amount of float and to expand to increase the amount of float; and
a plurality of shoulder screws to provide a maximum distance the second portion may float from the first portion.

18. The information handling system of claim 17, the second portion of the device carrier includes:
a slot insert to slide within the second slot of the second bay, wherein the slot insert is substantially parallel with one of the first and second side rails.

19. The information handling system of claim 18, wherein the slot insert includes a plurality of compression springs to secure the slot insert within the second slot of the bay.

20. The information handling system of claim 17, wherein the first portion includes a first overlap and the second portion includes a second overlap, wherein the second overlap extends from the second portion and below a top edge of the first overlap.

* * * * *